US012240060B2

United States Patent
Mutuku et al.

(10) Patent No.: US 12,240,060 B2
(45) Date of Patent: Mar. 4, 2025

(54) SnIn SOLDER ALLOYS

(71) Applicant: INDIUM CORPORATION, Utica, NY (US)

(72) Inventors: Francis M. Mutuku, Utica, NY (US); Ning-Cheng Lee, Utica, NY (US); Hongwen Zhang, Utica, NY (US)

(73) Assignee: INDIUM CORPORATION, Utica, NY (US)

( * ) Notice: Subject to any disclaimer, the term of this patent is extended or adjusted under 35 U.S.C. 154(b) by 0 days.

(21) Appl. No.: 17/877,437

(22) Filed: Jul. 29, 2022

(65) Prior Publication Data

US 2022/0362890 A1     Nov. 17, 2022

Related U.S. Application Data

(62) Division of application No. 16/557,587, filed on Aug. 30, 2019, now Pat. No. 11,999,018.

(Continued)

(51) Int. Cl.
  *B23K 35/26*     (2006.01)
  *B23K 35/02*     (2006.01)
  (Continued)

(52) U.S. Cl.
  CPC ........ *B23K 35/262* (2013.01); *B23K 35/0244* (2013.01); *B23K 35/025* (2013.01);
  (Continued)

(58) Field of Classification Search
  CPC ............... B23K 35/262; B23K 35/264; B23K 2101/42; B23K 35/0244; B23K 35/025; C22C 12/00; C22C 13/02; C22C 30/06
  See application file for complete search history.

(56) References Cited

U.S. PATENT DOCUMENTS 6,156,132 A    12/2000  Yamashita et al.
6,176,947 B1 *  1/2001  Hwang ................... C22C 13/00
                                                420/560

(Continued)

FOREIGN PATENT DOCUMENTS

CN      103146953 A  *  6/2013
CN      103906598        7/2014

(Continued)

OTHER PUBLICATIONS

JP-2007105750-A: Espacenet English machine translation (Year: 2007).*

(Continued)

*Primary Examiner* — Adil A. Siddiqui
(74) *Attorney, Agent, or Firm* — Sheppard, Mullin, Richter & Hampton LLP

(57) ABSTRACT

Some implementations of the disclosure are directed to low melting temperature (e.g., liquidus temperature below 210° C.) SnIn solder alloys. A SnIn solder alloy may consist of: 8 to 20 wt % In; greater than 0 wt % to 4 wt % Ag; optionally, one or more of greater than 0 wt % to 5 wt % Sb, greater than 0 wt % to 3 wt % Cu, greater than 0 wt % to 2.5 wt % Zn, greater than 0 wt % to 1.5 wt % Ni, greater than 0 wt % to 1.5 wt % Co, greater than 0 wt % to 1.5 wt % Ge, greater than 0 wt % to 1.5 wt % P, and greater than 0 wt % to 1.5 wt % Mn; and a remainder of Sn.

19 Claims, 11 Drawing Sheets

Related U.S. Application Data

(60) Provisional application No. 62/726,181, filed on Aug. 31, 2018.

(51) Int. Cl.
*B23K 101/42* (2006.01)
*C22C 12/00* (2006.01)
*C22C 13/02* (2006.01)
*C22C 30/06* (2006.01)

(52) U.S. Cl.
CPC ............ *B23K 35/264* (2013.01); *C22C 12/00* (2013.01); *C22C 13/02* (2013.01); *C22C 30/06* (2013.01); *B23K 2101/42* (2018.08)

(56) References Cited

U.S. PATENT DOCUMENTS

| | | | |
|---|---|---|---|
| 9,741,676 B1* | 8/2017 | Luo | H01B 1/026 |
| 2016/0271737 A1* | 9/2016 | Ikeda | B23K 35/0205 |
| 2017/0197281 A1* | 7/2017 | Choudhury | B23K 1/0016 |

FOREIGN PATENT DOCUMENTS

| | | |
|---|---|---|
| CN | 105121677 | 12/2015 |
| CN | 105215569 | 1/2016 |
| CN | 107809609 | 3/2018 |
| JP | 2634553 B2 | 7/1997 |
| JP | H10314980 | 12/1998 |
| JP | H11 33775 | 2/1999 |
| JP | 2007105750 A * | 4/2007 |
| JP | 2017177211 | 10/2017 |
| WO | WO 2016/178000 | 11/2016 |

OTHER PUBLICATIONS

CN-103146953-A: Espacenet English machine translation (Year: 2013).*
Second Office Action issued Oct. 8, 2022 for Chinese Application No. 2019800566000.
International Search Report and Written Opinion mailed Dec. 9, 2019 for International Application No. PCT/US2019/049169, filed Aug. 30, 2019.
Office Action issued Dec. 3, 2021 for Chinese Application No. 2019800566000.
Zhao et al., Electromigration Behaviors and Effects of Addition Elements on the Formation of a Bi-rich Layer in the SN58Bi-Based Solders, Journal of Electronic Materials, vol. 43, No. 11, 2014, 7 pages.
Final Office Action dated Aug. 18, 2023 for U.S. Appl. No. 16/557,587.
Notification of Decision Rejection issued Apr. 21, 2023 for Chinese Application No. 2201980056600.0.

* cited by examiner

FIG. 2

SnIn SOLDER ALLOYS

CROSS-REFERENCE TO RELATED APPLICATIONS

This application is a divisional of and claims the benefit of U.S. patent application Ser. No. 16/557,587 filed Aug. 30, 2019, titled "SNBI AND SNIN SOLDER ALLOYS", and issued as U.S. Pat. No. 11,999,018 on Jun. 4, 2024, which claims priority to U.S. provisional application No. 62/726,181, titled "HIGH FATIGUE RESISTANCE AND SHOCK RESISTANCE LOW MELTING TEMPERATURE LEAD-FREE SOLDER ALLOY" and filed Aug. 31, 2018. The aforementioned applications are incorporated herein by reference in their entirety.

TECHNICAL FIELD

The present disclosure relates generally to lead-free solder alloys.

DESCRIPTION OF THE RELATED ART

Lead (Pb) generated by the disposal of electronic assemblies is considered hazardous to the environment and human health. Regulations increasingly prohibit the use of Pb-based solders in the electronic interconnection and electronic packaging industries. The Restriction of Hazardous Substances Directed (RoHS) directive of Jul. 1, 2006 has led to successful replacement of SnPb solder alloys with Pb-free SnAgCu (SAC) solder alloys for use in microelectronics interconnects, particularly in smartphones, laptops, and many other electronic products.

Although a consistent track record of performance and desirable characteristics has been demonstrated in some SAC solder alloys such as SAC305, SAC solder alloys have a drawback due to their high melting temperatures (e.g., above 215° C.), which is higher than that of the SnPb solder alloys they replaced. The high melting temperatures of SAC solder alloys may be a major drawback where the solder is used in in applications that involve heat sensitive parts such as LEDs, optoelectronics, capacitors, fuses, MEMS devices, etc.

The high melting temperatures of SAC alloys may also pose a challenge to step soldering where previously soldered joints (lead-free solders) are not to be melted. Additionally, the high melting temperatures of the SAC solder alloys requires higher reflow temperatures during soldering, which predisposes components and Printed Circuit Boards (PCBs) to thermal warpage. Thermal warpage of the PCBs and components may compromise the integrity of the solder joints formed, which affects their performance. Thermal warpage of the PCBs, substrates, and components may also result in various solder defects such as head-in-pillow (H.i.P) and non-wet open, etc. While issues such as the HIP defect may be addressed by adjusting the volume of solder, the warpage of PCBs, substrates, and components is primarily addressed by lowering the reflow processing temperatures and shortening the time above the liquidus temperature. By lowering peak reflow temperatures from 250° C. to 190° C., for example, the inherent board-to-package warpage may be reduced by more than 50%, and the cost of production and carbon emissions may be significantly reduced.

SUMMARY

Some implementations of the disclosure are directed to low melting temperature SnBi or SnIn solder alloys. The solder alloys may have a liquidus temperature below 210° C. In some implementations, the solder alloys may have a liquidus temperature between 140° C. and 200° C.

In one embodiment, a SnBbi solder alloy consists of: 2 to 60 wt % Bi; optionally, one or more of: up to 16 wt % In, up to 4.5 wt % Ag, up to 2 wt % Cu, up to 12 wt % Sb, up to 2.5 wt % Zn, up to 1.5 wt % Ni, up to 1.5 wt % Co, up to 1.5 wt % Ge, up to 1.5 wt % P, and up to 1.5 wt % Mn; and a remainder of Sn, wherein the solder alloy has a liquidus temperature below 210° C. In some implementations, the SnBi solder alloy has a yield strength between 50 and 80 MPa at room temperature. In some implementations, the SnBi solder alloy has a tensile strength between 70 and 110 MPa at room temperature. In some implementations, the SnBi solder alloy has a tensile strength between 70 and 100 MPa at room temperature.

In some implementations, the SnBi solder alloy has 2 to 56 wt % Bi and 0.5 to 4.5 wt % Ag. In some implementations, the solder alloy has 2 to 54 wt % Bi; and 1.0 to 4.5 wt % Ag. In some implementations, the solder alloy has: 28 to 56 wt % Bi; and 0.5 to 2.5 wt % Ag. In some implementations, the solder alloy has: greater than 0 to 16 wt % In; greater than 0 to 12 wt % Sb, and greater than 40 wt % Sn.

In some implementations, the SnBi solder alloy consists of: 50 to 60 wt % Bi; optionally, one or more of: up to 2 wt % Ag, up to 2 wt % Sb, up to 1 wt % Cu, up to 1.5 wt % In, up to 0.1 wt % Ni, up to 0.2 wt % Co, and up to 0.2 wt % Ge; and a remainder of Sn. In some implementations, the solder alloy has at least one of: up to 2 wt % Ag, up to 2 wt % Sb, and up to 1 wt % Cu. In some implementations, the difference between the liquidus temperature of the solder alloy and the solidus temperature of the solder alloy is less than 20° C. In some implementations, the solder alloy has a liquidus temperature between 140° C. and 160° C.

In some implementations, the SnBi solder alloy consists of: 40 to 55 wt % Bi; optionally, one or more of: up to 10 wt % In, up to 4 wt % Ag, up to 10 wt % Sb, up to 1.5 wt % Cu, up to 0.5 wt % Ni, up to 0.2 wt % Co, and up to 0.1 wt % Ge; and a remainder of Sn. In some implementations, the solder alloy has at least one of: up to 10 wt % In, up to 4 wt % Ag, up to 10 wt % Sb, and up to 1.5 wt % Cu.

In some implementations, the SnBi solder alloy consists of: 28 to 40 wt % Bi; optionally, one or more of: up to 10 wt % In, up to 3 wt % Ag, up to 10 wt % Sb, up to 1 wt % Cu, up to 0.1 wt % Ni, up to 0.1 wt % Co, and up to 0.1 wt % Ge; and a remainder of Sn. In some implementations, the solder alloy has at least one of: up to 10 wt % In, up to 3 wt % Ag, up to 10 wt % Sb, and up to 1 wt % Cu.

In some implementations, the SnBi solder alloy consists of: 10 to 28 wt % Bi; 8 to 18 wt % In; optionally, one or more of: up to 3 wt % Ag, up to 3 wt % Sb, up to 1.2 wt % Cu, up to 0.05 wt % Ni, up to 0.5 wt % Zn, and up to 0.1 wt % Ge; and a remainder of Sn. In some implementations, the solder alloy has at least one of: up to 3 wt % Ag, up to 3 wt % Sb, and up to 1.2 wt % Cu.

In one embodiment, a SnIn solder alloy consists of: 8 to 20 wt % In; optionally, one or more of: up to 12 wt % Bi, up to 4 wt % Ag, up to 5 wt % Sb, up to 3 wt % Cu, up to 2.5 wt % Zn, up to 1.5 wt % Ni, up to 1.5 wt % Co, up to 1.5 wt % Ge, up to 1.5 wt % P, and up to 1.5 wt % Mn; and a remainder of Sn, wherein the solder alloy has a liquidus temperature below 210° C. In some implementations, the solder alloy has a yield strength between 50 and 70 MPa at room temperature. In some implementations, the solder alloy has a tensile strength between 65 and 90 MPa at room temperature.

In some implementations, the SnIn the solder alloy consists of: 8.0 to 20.0 wt % In; 1.0 to 4.0 wt % Ag; optionally, one or more of up to 12 wt % Bi, up to 3 wt % Cu, up to 2 wt % Sb, up to 2.5 wt % Zn, up to 1.5 wt % Ni, up to 1.5 wt % Co, up to 1.5 wt % Ge, up to 1.5 wt % P, and up to 1.5 wt % Mn; and a remainder of Sn. In some implementations, the solder alloy has at least one of: up to 12 wt % Bi, up to 3 wt % Cu, and up to 2 wt % Sb. In some implementations, the solder alloy has greater than 70 wt % Sn.

In some implementations, the SnIn solder alloy consists of: 10 to 18 wt % In; optionally, one or more of up to 12 wt % Bi, up to 4 wt % Ag, up to 5 wt % Sb, up to 2 wt % Cu, up to 0.2 wt % Co, up to 0.2 wt % Ni, and up to 0.2 wt % Ge; and a remainder of Sn. In some implementations, the solder alloy has at least one of: up to 12 wt % Bi, up to 4 wt % Ag, up to 5 wt % Sb, and up to 2 wt % Cu.

In one embodiment, a method comprises: applying a solder composition between a substrate and device to form an assembly, wherein the solder composition comprises any one of the aforementioned solder alloys; and reflow soldering the assembly to form a solder joint. The assembly may be reflow soldered at a peak temperature between 150° C. and 200° C. The solder composition may be a solder paste comprising flux and the solder alloy.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

BRIEF DESCRIPTION OF THE DRAWINGS

The technology disclosed herein, in accordance with one or more various embodiments, is described in detail with reference to the included figures. The figures are provided for purposes of illustration only and merely depict example implementations.

FIG. 2 includes bar charts showing the tensile strength (in MPa), yield strength (in MPa), and modulus (in GPa) of additional solder alloys in accordance with the disclosure as compared with that of SAC305.

Figure 1:
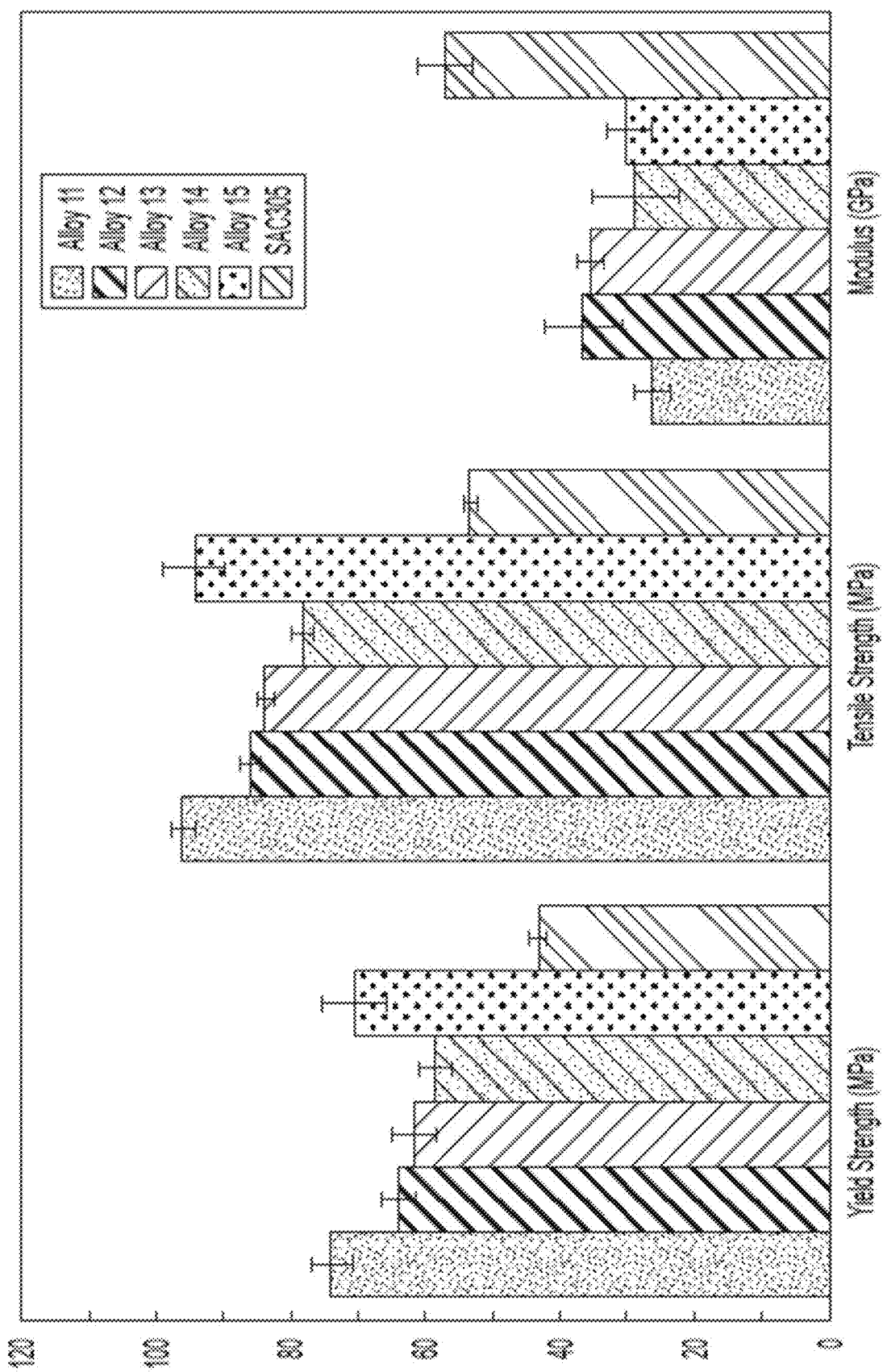
FIG. 1 includes bar charts showing the tensile strength (in MPa), yield strength (in MPa), and modulus (in GPa) of solder alloys in accordance with the disclosure as compared with that of SAC305.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION

As noted above, although some SAC solder alloys have shown a consistent track record of performance and desirable characteristics, their higher melting temperatures necessitate higher reflow temperatures, which introduces problems such as thermal warpage of PCBs, substrates, and other components. In an effort to solve this problem, as well as maintaining Pb-free solder alloys, low melting temperature alloys including eutectic SnBi solder alloys and near eutectic SnBiAg solder alloys have been developed. However, these SnBi and SnBiAg solder alloys are not robust enough to meet most, if not all, of the requirements of a good low temperature solder alloy.

Although some SnBi and SnBiAg solder alloys have relatively low melting temperatures and thus allow for reflow at lower temperatures as compared to SAC solder alloys, these solder alloys may not exhibit good mechanical properties, good solderability, and/or high reliability (e.g., good thermal fatigue resistance and/or high impact shock resistance). Some of these solder alloys have poor reliability and durability, especially due to their limited strengthening mechanisms and the segregation of brittle bismuth (Bi) near the interface. The segregation of bismuth near the interface makes the eutectic SnBi and SnBiAg alloys vulnerable to brittle failure, especially when high stresses are applied. These eutectic and near eutectic SnBi and SnBiAg alloys may have low fatigue resistance as well as cracks initiate and propagate along the segregated bismuth near the interface. The Sn—Bi alloys may also lack sufficient strengthening mechanisms. Their strengthening primarily depends on substitutional solid solution of Bi in Sn and particle strengthening from precipitated Bi. These strengthening mechanisms may not sufficiently impede propagation of all possible dislocations, and hence more strengthening mechanisms may be needed. As such, although eutectic SnBi and SnBiAg and near eutectic SnBi and SnBiAg alloys may avoid the need for a high reflow temperature, they may not meet all the performance requirements of a good solder alloy.

In view of the above issues with these alloys, there exists a need in the microelectronics industry for low melting temperature (reflow temperature below 200° C.) solder alloys that meet most, if not all, of the mechanical properties and reliability requirements of a good low melting Pb-free solder alloy. For example, thermal cycling resistance at a peak temperature of 85° C. or even 125° C. may be needed.

In particular, there is a need for Pb-free low melting temperature solder alloys with increased ductility, tougher interfaces, higher creep and fatigue resistances, higher shear strength, and/or improved drop shock resistance as compared to eutectic SnBi and SnBiAg and near eutectic SnBi and SnBiAg solder alloys. Additionally, there is a need for solder alloys that meet these characteristics and exhibit comparable or better thermal fatigue and drop shock resistances as compared to SAC solder alloys such as SAC305.

To this end, implementations of the disclosure are directed to solder alloys that are directed to addressing these problems. In particular, implementations of the disclosure are directed to solder alloys that provide one or more of: an improved microstructure by refining grains, improved ductility, a reduced pasty range (i.e., range between solidus and liquidus temperatures), minimized bismuth segregation near the interface, and/or improved reliability (e.g., by increasing thermal fatigue resistance, creep resistance, and/or drop shock resistance). Additionally, some implementations of the disclosure are directed to solder alloys that provide improved thermal fatigue resistance, and/or increased drop shock resistance as compared to that of conventional SAC solder alloys such as SAC305. Further, some implementations of the disclosure are directed to solder alloys with a reduced chance of hot tearing during the alloys' solidification process by narrowing a pasty range of the solder alloys.

The solder alloys described herein may be used either in paste form (e.g., mixture of solder powder and flux), as a solder ball, as a solder preform, as a solder bar, a solder powder, or any other form that is suitable for electronic and microelectronic consumer applications and other relevant and/or related applications. The solder alloys of the present disclosure may be particularly suitable for, but not limited to, forming solder joints, such as homogeneous solder joints or hybrid solder joints with SAC alloys. The low temperature solder alloys described herein may form solder joints of low voiding, high thermal fatigue resistance, relatively higher ductility as compared to eutectic SnBi, and/or low shear strength degradation with temperature when soldered on different surface finishes. For example, solder alloys of the present disclosure may be used in mounting electronic components to PCBs having various surface finishes, including an organic solderability preservative (OSP) surface finish used for copper pads or other pads, an electroless nickel immersion (ENIG) surface finish, or some other suitable surface finish. As a particular example, a solder alloy of the present disclosure may be implemented as a solder paste that is applied between a substrate (e.g., Cu substrate) and electronic device to form an assembly, and reflow soldered at a suitable temperature range (e.g., between 150° C. and 210° C.) to form a solder joint.

As will be further appreciated by experimental results included herein, the low temperature Pb-free solder alloys described herein may exhibit higher thermal fatigue resistance and stable shear strength even at elevated temperatures, and higher drop shock resistance as compared to eutectic SnBi and SnBiAg. Additionally, the solder alloys described herein may have moduli ranging from lower to higher than that of SAC alloys and hence possessing a wide range of responses to different stress loads. The solder alloys described herein may have tensile properties such as Young's modulus, tensile strength and yield strength ranging from lower than, comparable to, and higher than that of SAC solder alloys. The wide coverage of the tensile properties of the solder alloys described herein may ensure an easy selection of the most appropriate alloy for a wide variety of applications. Additionally, the solder alloys described herein may have a very low percentage degradation in the shear strength with both elevated temperature and after aging at 100° C.

As further described below, solder alloys in accordance with the present disclosure may also have a very low percentage degradation in shear strength with both aging at 100° C. and after thermal cycling. The alloys may cycle at a harsh thermal cycling profile such as −40/125° C. with good thermal cycling performance and reliability.

In accordance with implementations of the disclosure, a solder alloy with improved microstructure, improved ductility, a reduced pasty range, minimized bismuth segregation near the interface, and/or improved reliability may be obtained by compositional balancing of alloying elements such as silver (Ag), antimony (Sb), indium (In), copper (Cu), nickel (Ni), manganese (Mn), cobalt (Co), germanium (Ge), and zinc (Zn) added in certain amounts to a binary alloy system containing tin (Sn) and either bismuth (Bi) or indium (In) as main components. It should be noted that the number of alloying elements used and the amount of each of these elements in a given alloy may depend on the targeted properties and the application.

In particular, alloying elements such as Sb, Co, Mn and Ni may be included in the alloy to refine the grain of the microstructure of the alloy and improve its properties. Antimony may be included to increase ductility of SnBi and hence improve drop shock resistance. Additionally, antimony may provide an substitutional solid solution at higher service temperature, thus improving the mechanical properties, creep resistance, and reliability performance of the solder alloy. Further, antimony may provide for improved thermal fatigue resistance by providing second phase particle strengthening of the solder matrix, in which SnSb particles may precipitate at lower temperature. Moreover, antimony may lower a pasty range of the solder alloy by increasing its solidus temperature.

In addition to providing grain refinement and hence grain boundary strengthening, nickel may be included to improve the interface toughness and thus increase the drop shock resistance by formation of $(Cu,Ni)_6Sn_5$ rather than $Cu_6Sn_5$ along the Cu/OSP finish, allowing reduction of copper dissolution and the thinner interfacial IMC under service. Additionally, nickel may offer second phase particle strengthening of the matrix and hence improved thermal fatigue resistance.

Silver may also be included to offer second phase particle strengthening of the matrix and hence improved thermal fatigue resistance. Additionally, silver may provide for solid solution strength and lower a pasty range of the solder alloy by increasing its solidus temperature.

Indium may be included to lower both solidus and liquidus temperatures of the solder alloy. It may increase the ductility of SnBi and hence improve drop shock performance. It may also provide solid solution strengthening.

In some implementations, germanium may be included as an alloying element to improve solder joint luster and provide grain refinement and hence grain boundary strengthening.

Bismuth may be included as an alloying element in some implementations to provide any one of the following benefits: lower a melting temperature of Sn and hence the solder alloy's pasty range, provide solid solution strengthening, improve thermal fatigue resistance and creep resistance, and/or precipitate strengthening.

The alloying elements of the present disclosure may be engineered such that target liquidus, solidus and/or pasty ranges are achieved in addition to other material properties. In accordance with some implementations, the solder alloys of the present disclosure may be designed to form a high quality solder joint after reflow at a peak temperature between 150° C. and 200° C. For example, the solder alloys of the present disclosure may have a liquidus temperature between about 140° C. and 200° C.

Table 1, below, shows a composition by wt % of some example solder alloys that may be implemented in accordance with the disclosure. A solidus temperature (° C.), liquidus temperature (° C.), and a delta (i.e., pasty range) between the liquidus and solidus temperatures are also shown for some of these example solder alloys. The example alloys of Table 1 will be further discussed below with references to FIGS. 1-12 and Tables 2-6.

TABLE 1

Solder Alloy Composition (wt %) and Solidus and Liquidus Temperatures (° C.)

| Alloy # | Sn | Bi | Ag | In | Sb | Cu | Ni | Zn | Solidus | Liquidus | ΔT |
|---|---|---|---|---|---|---|---|---|---|---|---|
| Alloy 1 | 43.4 | 55.1 | 1.5 | | | | | | 137 | 143 | 6 |
| Alloy 2 | 48.2 | 47.9 | 2 | 0.4 | 1 | 0.4 | | 0.1 | 136 | 159 | 23 |
| Alloy 3 | 53.9 | 46.1 | | | | | | | 138 | 172 | 34 |
| Alloy 4 | 72.1 | 3.7 | 3 | 16.9 | 3.1 | 1.2 | | | 159 | 192 | 33 |
| Alloy 5 | 78-82 | 1-1.6 | 3.3 | 13 | 0.6 | 1.2 | | | 175 | 199 | 24 |
| Alloy 6 | 61.9 | 35 | 2 | 0.3 | 0.3 | 0.5 | | | 136 | 182 | 46 |
| Alloy 7 | 76.5 | 5 | 2.5 | 16 | | | | | 156 | 194 | 38 |
| Alloy 8 | 54 | 43.5 | 2.3 | 0.1 | 0.1 | | 0.02 | | 138 | 164 | 26 |
| Alloy 9 | 66.9 | 27.6 | 3.6 | 1.5 | 0.2 | 0.2 | | | 130 | 185 | 55 |
| Alloy 10 | 64.1 | 32 | 2.3 | 0.6 | 0.5 | 0.5 | | | 134 | 184 | 50 |
| Alloy 11 | 64.3 | 32.4 | 1.9 | 0.8 | 0.3 | 0.3 | | | 134 | 185 | 51 |
| Alloy 12 | 55 | 44 | 0.8 | 0.1 | 0.1 | | | | 138 | 176 | 38 |
| Alloy 13 | 54.6 | 43.8 | 1 | 0.4 | | 0.2 | | | 134 | 169 | 35 |
| Alloy 14 | 53.2 | 45 | 1.2 | 0.5 | 0.1 | | | | 135 | 172 | 37 |
| Alloy 15 | 59 | 38 | 2.4 | 0.5 | 0.1 | | | | 136 | 176 | 40 |
| Alloy 16 | 76.2 | 3.9 | 3.5 | 14.3 | 0.5 | 1.6 | | | 160 | 194 | 34 |
| Alloy 17 | 76.4 | 3.9 | 2.6 | 15 | 0.6 | 1.5 | 0.02 | | 159 | 193 | 34 |
| Alloy 18 | 41.8 | 57.8 | 0.2 | 0.05 | 0.05 | 0.1 | 0.02 | | 136 | 146 | 10 |
| Alloy 19 | 53.6 | 45.9 | 0.5 | | | | | | 137 | 167 | 30 |
| Alloy 20 | 57.5 | 39.1 | 1.5 | 0.2 | 0.6 | 1.1 | | | 136 | 176 | 40 |
| Alloy 21 | 40.8 | 57.8 | 1.2 | 0 | 0 | 0.2 | 0.02 | | 136 | 146 | 10 |
| Alloy 22 | 40.4 | 57.6 | 0.4 | 0.1 | 1 | 0.5 | 0.02 | | 136 | 151 | 15 |
| Alloy 23 | 56.6 | 41.8 | 1.5 | | | 0.1 | | | 137 | 188 | 51 |
| Alloy 24 | 41.8 | 57.8 | 0.2 | 0.05 | 0.05 | 0.1 | 0.02 | | 136 | 146 | 10 |
| Alloy 25 | 41.9 | 56.9 | 1 | | 0.1 | 0.1 | 0.02 | | 137 | 150 | 13 |
| Alloy 26 | 45.16 | 52.1 | 1.9 | 0.38 | | | | 0.46 | | | |
| Alloy 27 | 77 | 3.4 | 3.5 | 14.4 | 0.2 | 1.5 | | | | | |
| Alloy 28 | 75 | 4.4 | 3.5 | 14.2 | 0.5 | 2.4 | | | | | |
| Alloy 29 | 76.2 | 3.8 | 3.5 | 14.1 | 0.1 | 2.3 | | | | | |
| Alloy 30 | 76.4 | 3.9 | 2.6 | 15 | 0.6 | 1.5 | | | | | |

In accordance with a first set of implementations, a Pb-free solder alloy may include 2 to 54 wt % Bi, 1.0 to 4.5 wt % Ag, and, optionally: up to 16 wt % In, up to 2 wt % Cu, and/or up to 12 wt % Sb. The solder alloy may also contain one or more of up to 2.5 wt % Zn, up to 1.5 wt % Ni, up to 1.5 wt % Co, up to 1.5 wt % Ge, up to 1.5 wt % P, and up to 1.5 wt % Mn. The remainder of the solder alloy may be Sn and other unavoidable impurities.

In accordance with a second set of implementations, a Pb-free solder alloy may include 28 to 56 wt % Bi, 0.5 to 2.5 wt % Ag, and, optionally: up to 3.0 wt % In, and/or up to 2.0 wt % Sb. The solder alloy may also contain one or more of up to 2.0 wt % Cu, up to 2.5 wt % Zn, up to 1.5 wt % Ni, up to 1.5 wt % Co, up to 1.5 wt % Ge, up to 1.5 wt % P, and up to 1.5 wt % Mn. The remainder of the solder alloy may be Sn and other unavoidable impurities.

In accordance with a third set implementations, a Pb-free solder alloy may include 8.0 to 20.0 wt % In, 1.0 to 4.0 wt % Ag, and, optionally: up to 12.0 wt % Bi, up to 3.0 wt % Cu, and/or up to 2.0 wt % Sb. The solder alloy may also contain one or more of up to 2.5 wt % Zn, up to 1.5 wt % Ni, up to 1.5 wt % Co, up to 1.5 wt % Ge, up to 1.5 wt % P, and up to 1.5 wt % Mn. The remainder of the solder alloy may be Sn and other unavoidable impurities.

In accordance with a fourth set of implementations, a Pb-free solder alloy may include 50 to 60 wt % Bi, and, optionally, up to 2 wt % Ag, up to 2 wt % Sb, and/or up to 1 wt % Cu. The solder alloy may also contain one or more of: up to 1.5 wt % In, up to 0.1 wt % Ni, up to 0.2 wt. % Co, and up to 0.2 wt. % Ge. The remainder of the solder alloy may be Sn and other unavoidable impurities.

In accordance with a fifth set of implementations, a Pb-free solder alloy may include 40 to 55 wt % Bi, and, optionally: up to 10 wt % In, up to 4 wt % Ag, up to 10 wt % Sb, and/or up to 1.5 wt % Cu. The solder alloy may also contain one or more of up to 0.5 wt % Ni, up to 0.2 wt % Co, and up to 0.1 wt % Ge. The remainder of the solder alloy may be Sn and other unavoidable impurities.

In accordance with a sixth set of implementations, a Pb-free solder alloy may include 28 to 40 wt % Bi, and, optionally: up to 10 wt % In, up to 3 wt % Ag, up to 10 wt % Sb, and/or up to 1 wt % Cu. The solder alloy may also contain one or more of up to 0.1 wt % Ni, up to 0.1 wt % Co, and up to 0.1 wt % Ge. The remainder of the solder alloy may be Sn and other unavoidable impurities.

In accordance with a seventh set of implementations, a Pb-free solder alloy may include 10 to 28 wt % Bi, 8 to 18 wt % In, and, optionally: up to 3 wt % Ag, up to 3 wt % Sb, and up to 1.2 wt % Cu. The solder alloy may also contain one or more of: up to 0.05 wt % Ni, up to 0.5 wt % Zn, and up to 0.1 wt % Ge. The remainder of the solder alloy may be Sn and other unavoidable impurities.

In accordance with an eighth set of implementations, a Pb-free solder alloy may include 10 to 18 wt % In, and, optionally: up to 12 wt % Bi, up to 4 wt % Ag, up to 5 wt % Sb, and up to 2 wt % Cu. The solder alloy may also contain one or more of: up to 0.2 wt % Co, up to 0.2 wt % Ni, and up to 0.2 wt % Ge. The remainder of the solder alloy may be Sn and other unavoidable impurities.

EXPERIMENTAL RESULTS

FIG. 1 includes bar charts showing the tensile strength (in MPa), yield strength (in MPa), and modulus (in GPa) at room temperature (e.g., about 25° C.) for several alloys (Alloys 11-15 of Table 1) in accordance with the first and/or second set of implementations as compared with that of SAC305. As illustrated, Alloys 11-15 exhibit a higher tensile strength and yield strength than SAC 305, and a lower modulus than SAC305.

Figure 2:
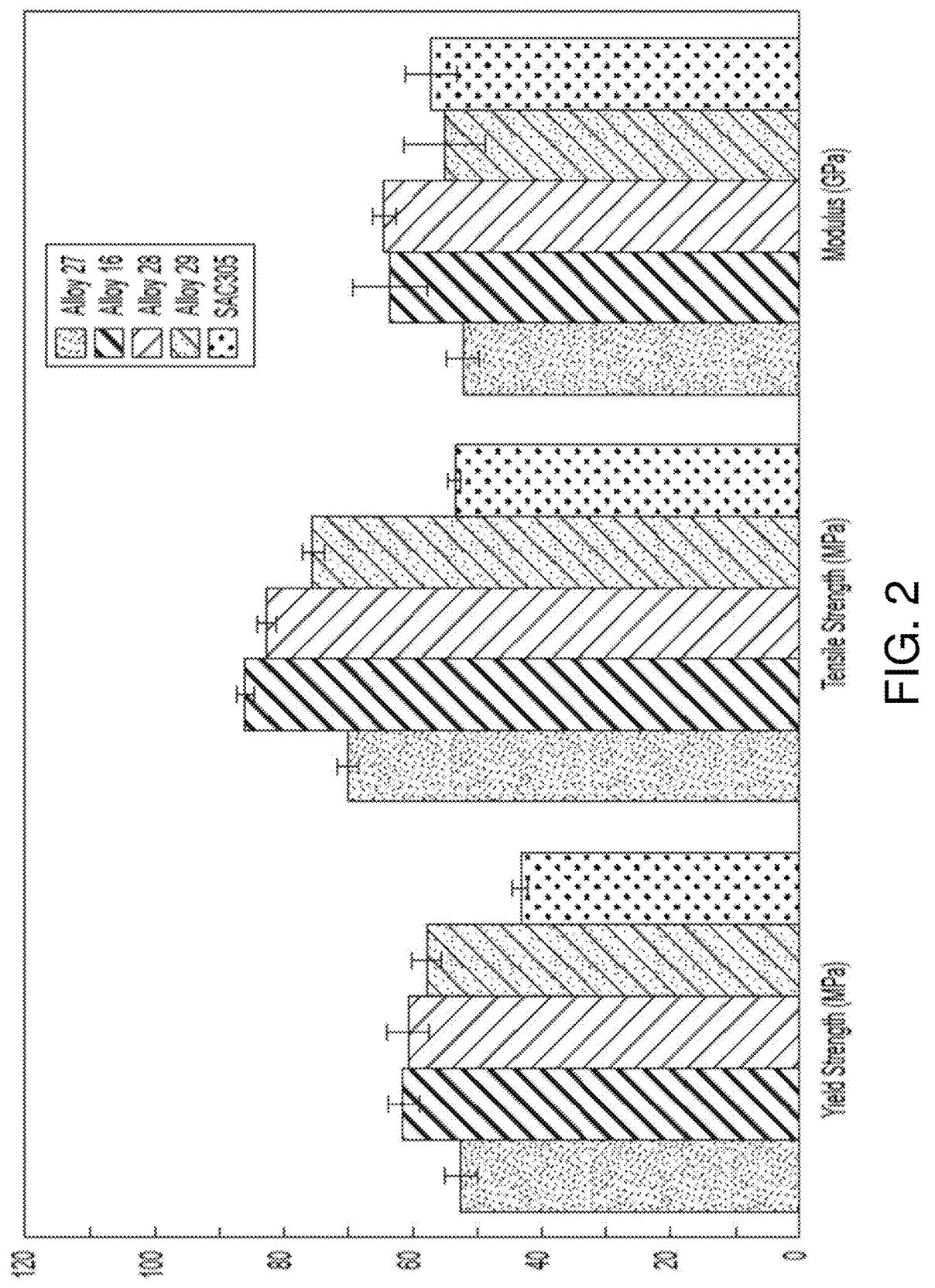

FIG. 2 includes bar charts showing the tensile strength (in MPa), yield strength (in MPa), and modulus (in GPa) at room temperature for several alloys (Alloys 16 and 27-29 of Table 1) in accordance with the third set of implementations as compared with that of SAC305. As illustrated, Alloys 16 and 27-29 exhibit a higher tensile strength and yield strength than SAC 305, and a similar or higher modulus then SAC305. As illustrated by FIGS. 1-2, compositional balancing of the alloying elements may be done to achieve an alloy having a higher yield strength and higher tensile strength than SAC305, and a lower, similar, or higher modulus than SAC305.

Figure 3:
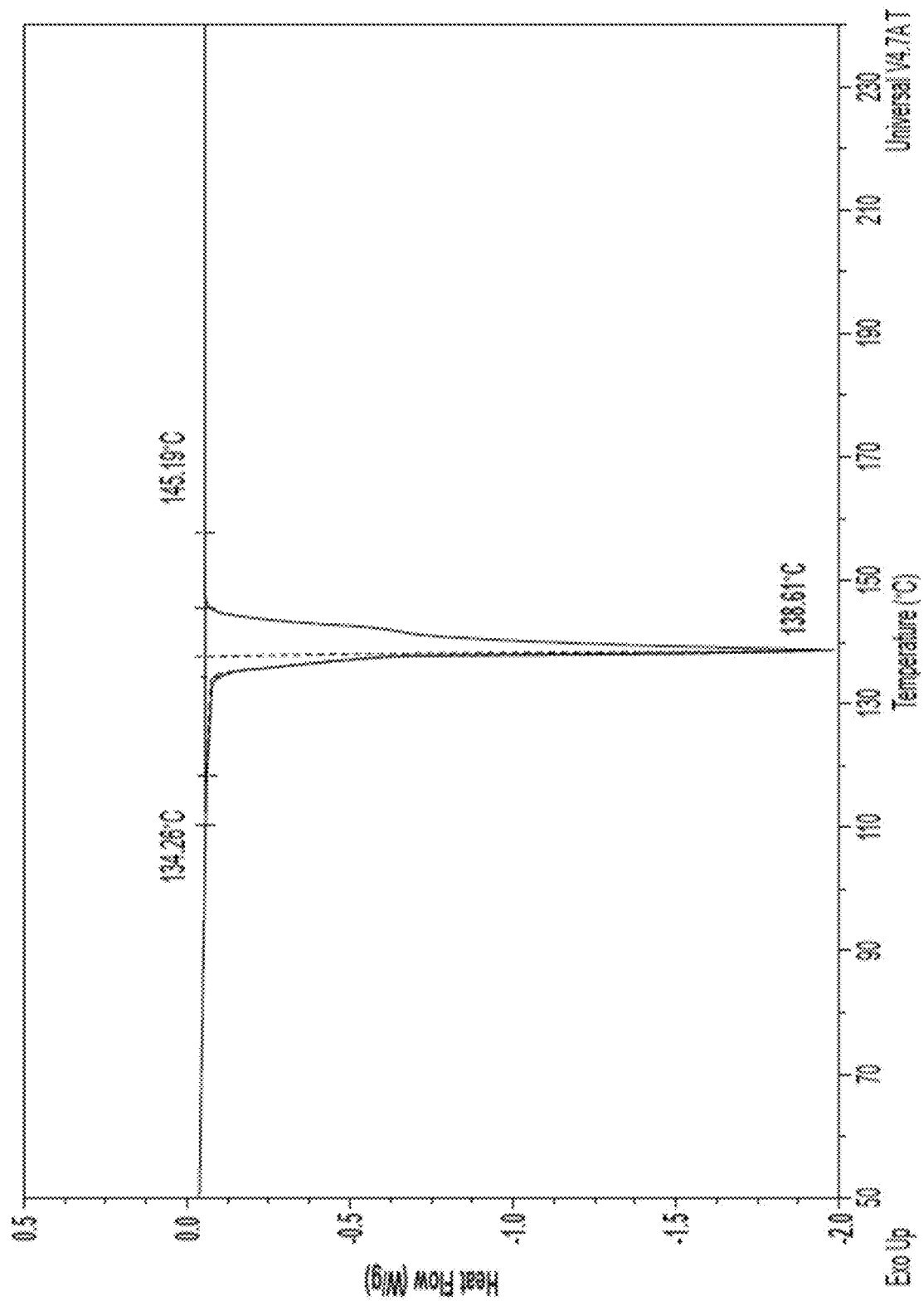
FIG. 3 shows a Differential Scanning calorimeter (DSC) curve performed with Q2000 DSC showing the melting range of a solder alloy in accordance with the disclosure.

FIG. 3 shows a Differential Scanning calorimeter (DSC) heating curve performed with Q2000 DSC showing the melting range of an alloy (Alloy 26 of Table 1) in accordance with implementations. The ramp heating rate was 5° C./min.

Figure 4:
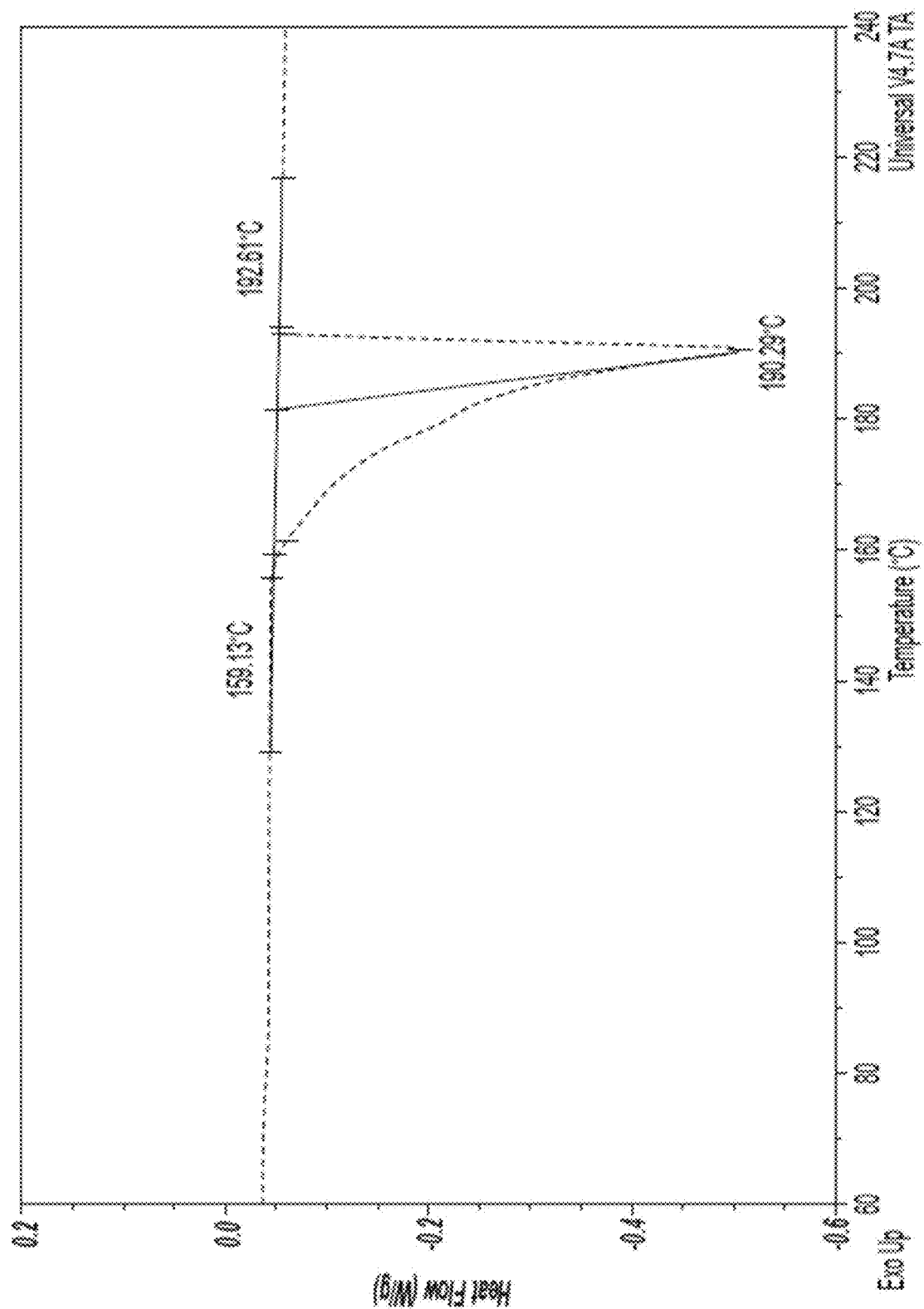
FIG. 4 shows a DSC curve performed with Q2000 DSC showing the melting range of another solder alloy in accordance with the disclosure.

FIG. 4 shows a Differential Scanning calorimeter (DSC) heating curve performed with Q2000 DSC showing the melting range of an alloy (Alloy 30 of Table 1) in accordance with implementations. The ramp heating rate was 5° C./min. As illustrated by the DSC curves of FIGS. 3-4, alloys with different solidus temperatures, liquidus temperatures, and pasty ranges may be achieved by compositional balancing of the alloying elements.

Figure 5:
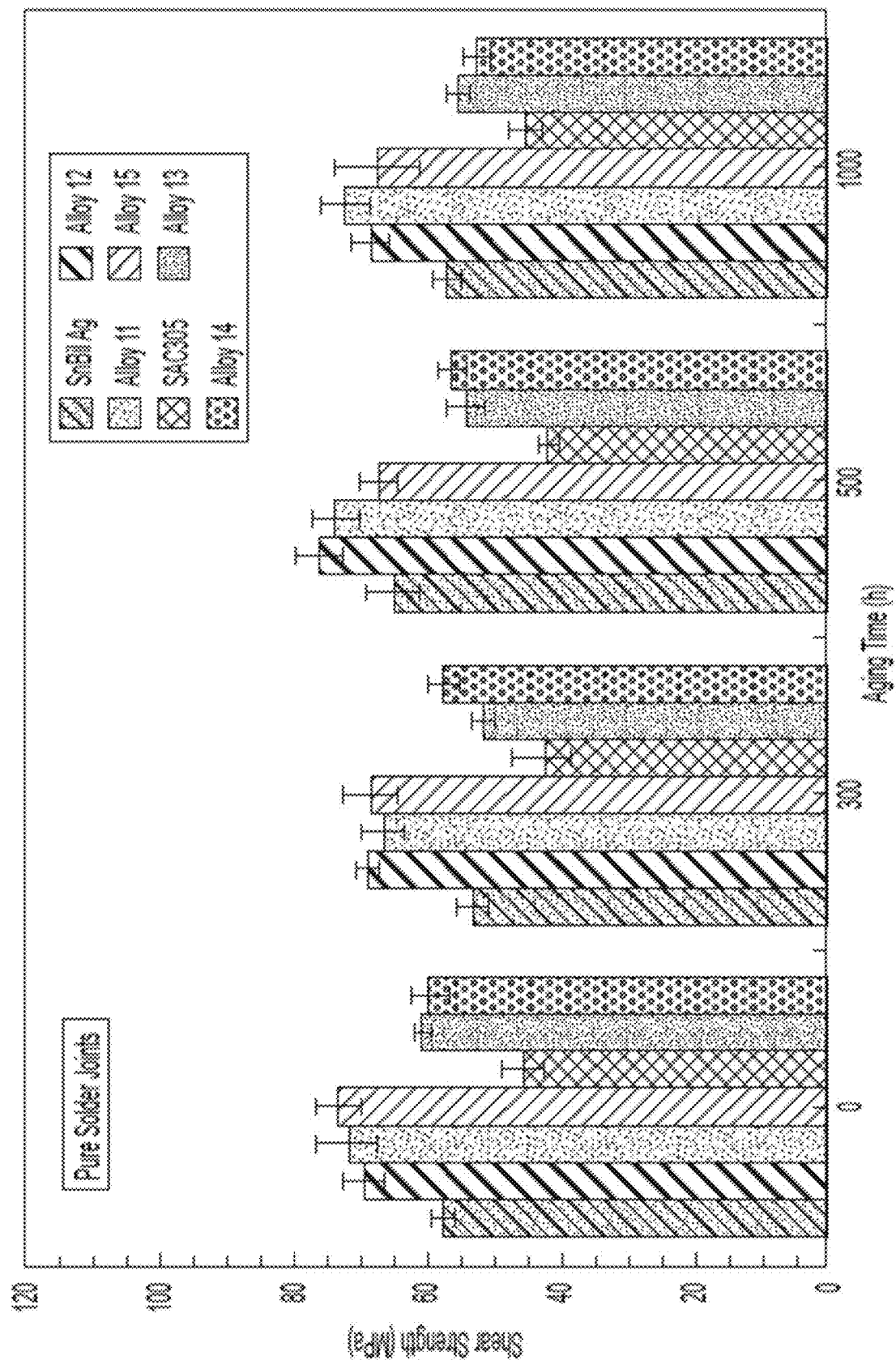
FIG. 5 includes bar charts showing the changes in the shear strength (in MPa) with aging of Ball Grid Array (BGA) size single pure solder joints of alloys in accordance with the disclosure, and control alloys SnBi1Ag and SAC305.

FIG. 5 includes bar charts showing the changes in the shear strength (in MPa) with aging of Ball Grid Array (BGA) size single pure solder joints of alloys (Alloys 11-15 of Table 1) in accordance with the first and/or second set of implementations, and control alloys SnBi1Ag and SAC305. As illustrated, there is very low shear strength degradation with aging up to 1000 hours at 100° C. The solder joints were sheared at a height of 60 µm and at a speed of 100 µm/s.

Figure 6:
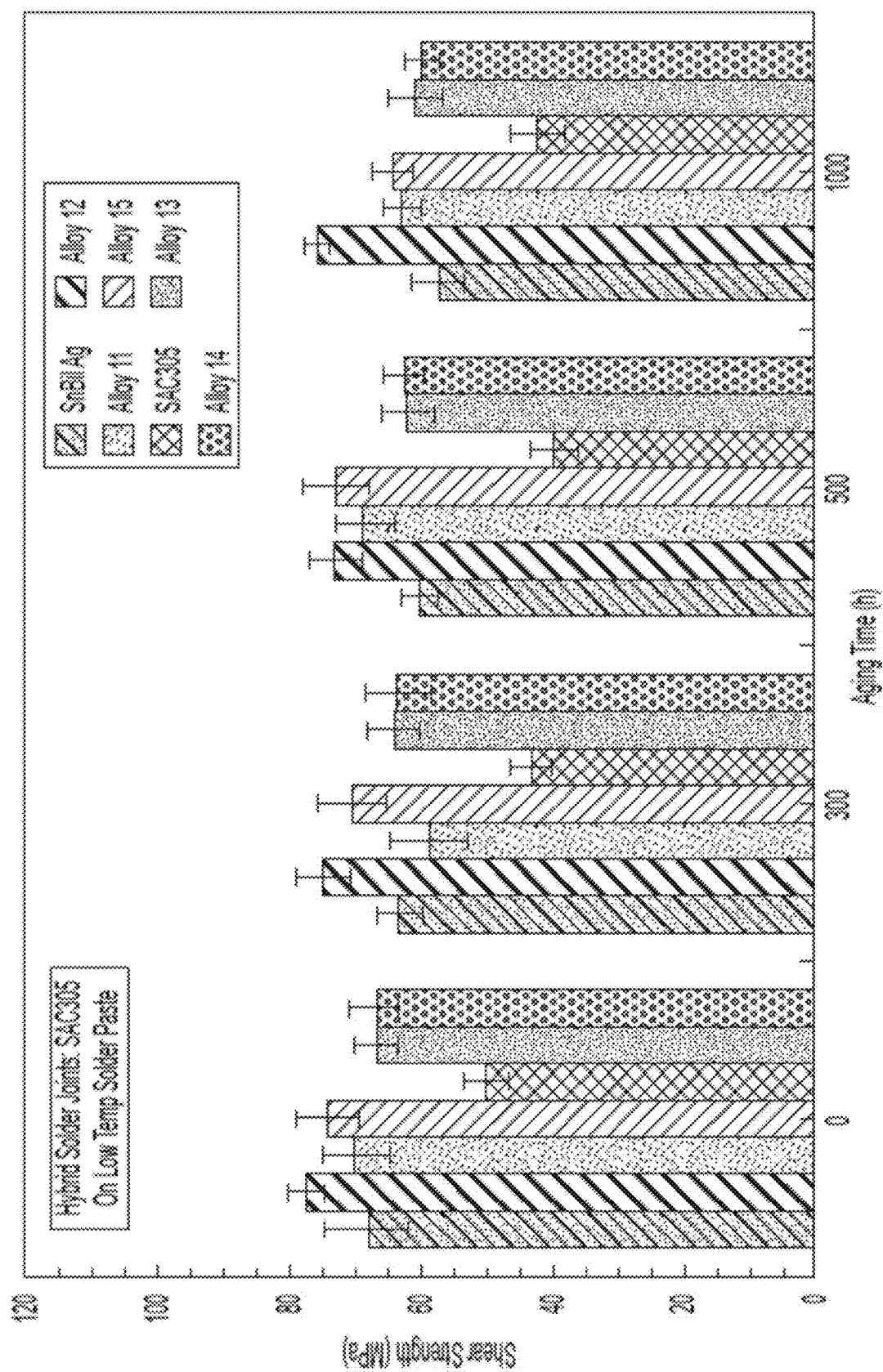
FIG. 6 includes bar charts showing the changes in the shear strength (in MPa) with aging of Ball Grid Array (BGA) size single hybrid solder joints of alloys in accordance with the disclosure, and control alloys SnBi1Ag and SAC305.

FIG. 6 includes bar charts showing the changes in the shear strength (in MPa) with aging of Ball Grid Array (BGA) size single hybrid solder joints of alloys (Alloys 11-15 of Table 1) in accordance with the first and/or second set of implementations, and control alloys SnBi1Ag and SAC305. The hybrid solder joints were made by reflowing SAC305 solder balls on the low temperature alloys. As illustrated, there is very low shear strength degradation with aging up to 1000 hours at 100° C. The solder joints were sheared at a height of 60 µm and at a speed of 100 µm/s. As illustrated by the examples of FIGS. 5-6, by balancing the amounts of the alloying elements, alloys in accordance with the present disclosure may be designed such that their shear strength does not degrade over aging.

Figure 7:
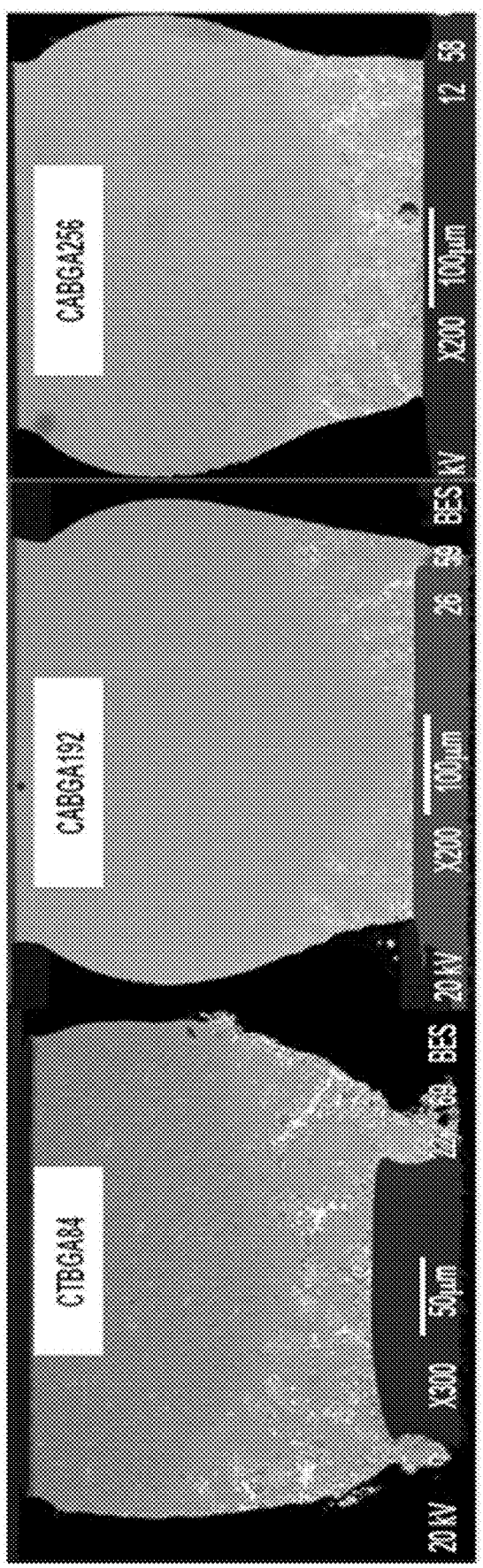
FIG. 7 illustrates scanning electron micrographs (SEMS) from a SAC305 solder ball reflowed on one of the solder alloys in accordance with disclosure for three different components.

FIG. 7 illustrates Scanning Electron Micrographs (SEMS) from a SAC305 solder ball reflowed on one of the solder alloys in accordance with the first set of implementations for three components: CTBGA84, ChipArray Ball Grid Array (CABGA)192 and CABGA256. The SEMs show good solder joints with a moderate percentage of bismuth mixing. As illustrated by this example, solder alloys in accordance with the disclosure may be designed such that a paste of the solder alloy may reflow well with a SAC solder alloy. Additionally, depending on factors such as the paste to ball volume ratio, bismuth mixing may be controlled to desired levels.

Figure 8:
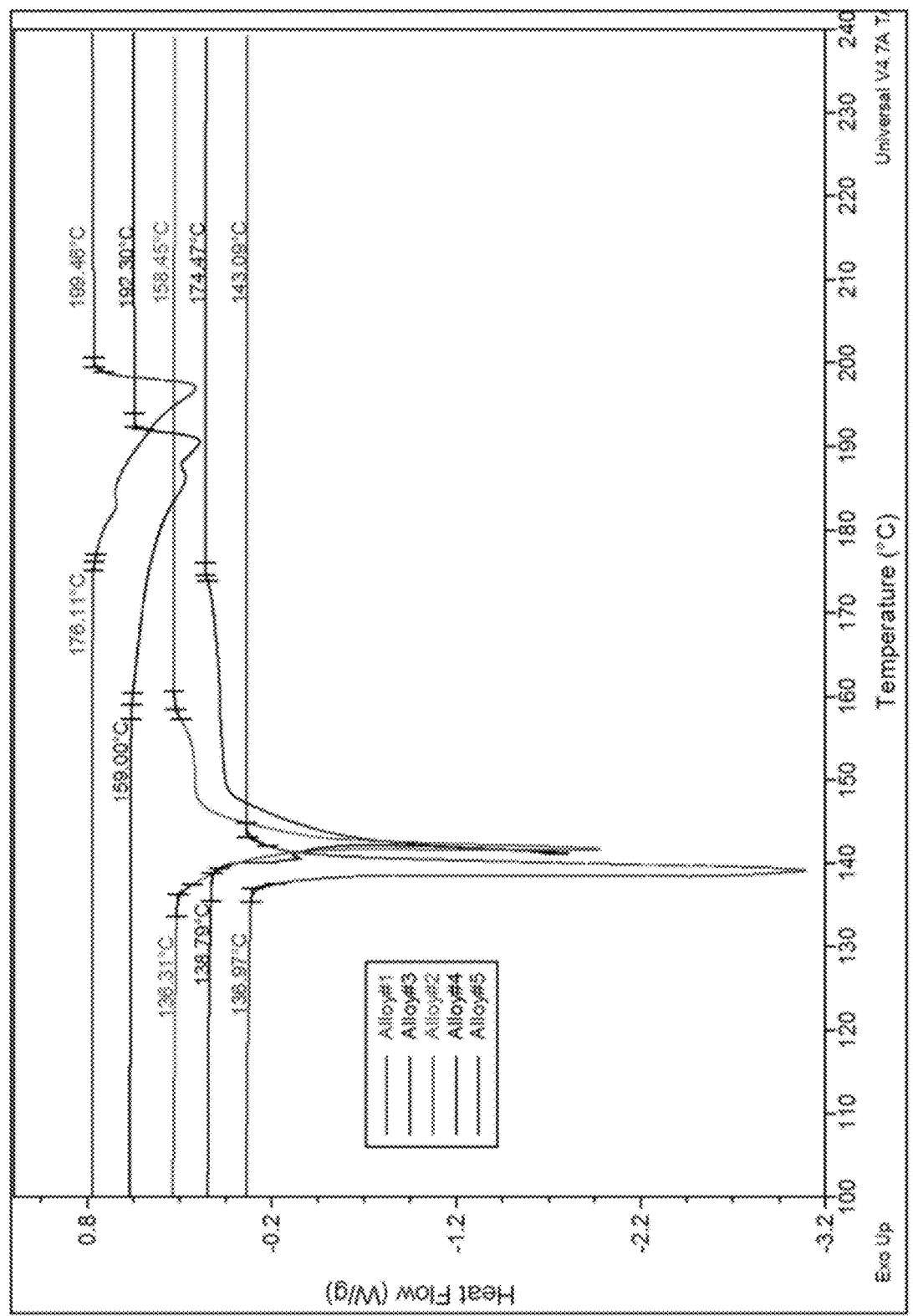
FIG. 8 illustrates DSC heating curves performed with Q2000 DSC showing the melting range of five solder alloys in accordance with implementations of the disclosure.

FIG. 8 illustrates DSC heating curves performed with Q2000 DSC showing the melting range of five alloys (Alloys 1-5 of Table 1) in accordance with implementations of the disclosure. The compositions of the five alloys range from near eutectic Sn—Bi to off eutectic solder alloys. The ramp heating rate used was 5° C./min.

Figure 9:
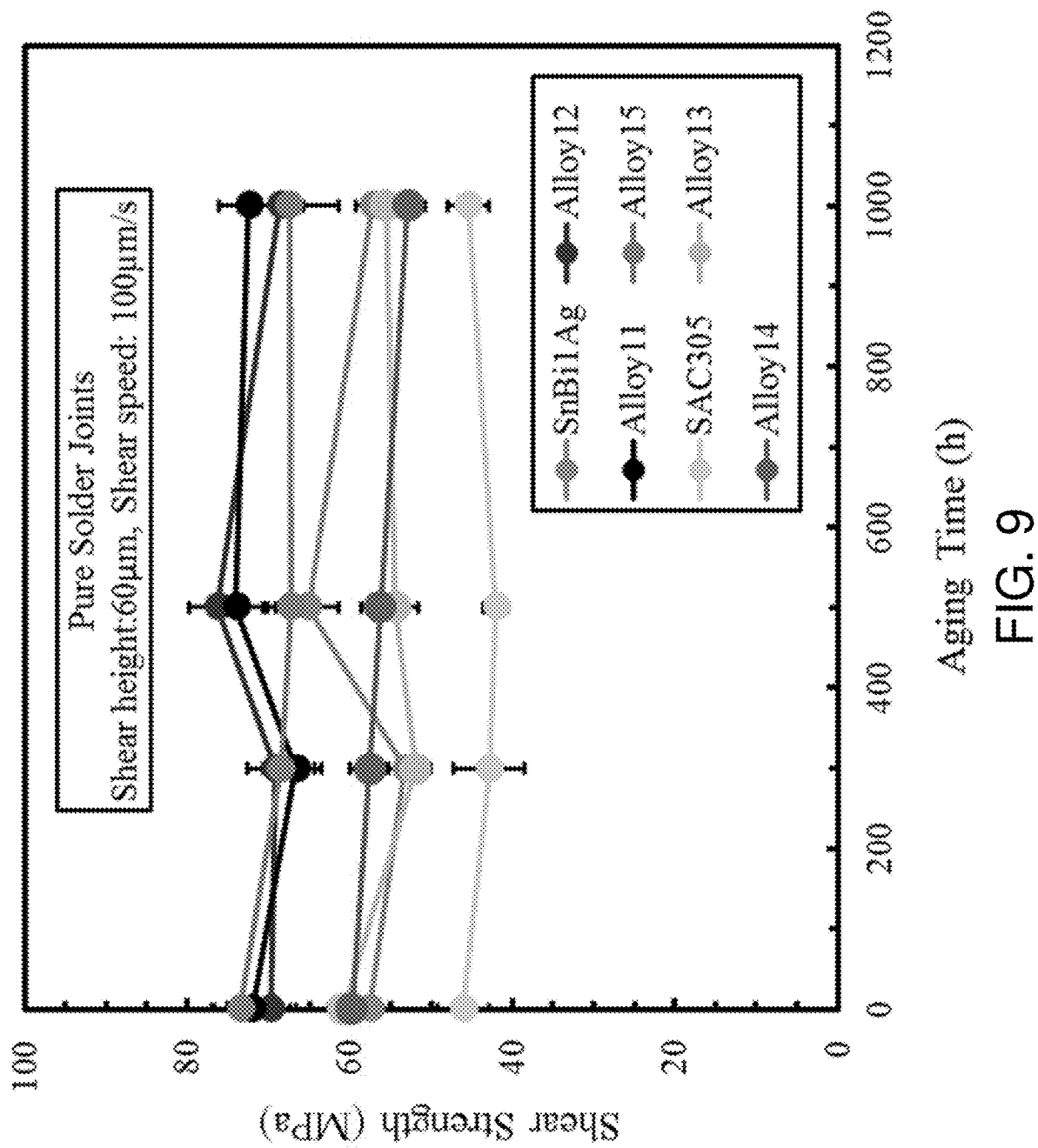
FIG. 9 illustrates plots showing the changes in the shear strength (in MPa) with aging of BGA size single pure solder joints formed from five solder alloys in accordance with implementations of the disclosure, and two control solder alloys: SnBi1Ag and SAC305.

FIG. 9 illustrates plots showing the changes in the shear strength (in MPa) with aging of Ball Grid Array (BGA) size single pure solder joints formed from five solder alloys (Alloys 11-15 of Table 1) in accordance with implementations of the disclosure, and two control solder alloys: SnBi1Ag and SAC305. Aging was conducted at 100° C., with the solder joints being sheared at a height of 60 µm and speed of 100 µm/s. The plots show low shear strength degradation with aging up to 1000 hours at 100° C.

Figure 10:
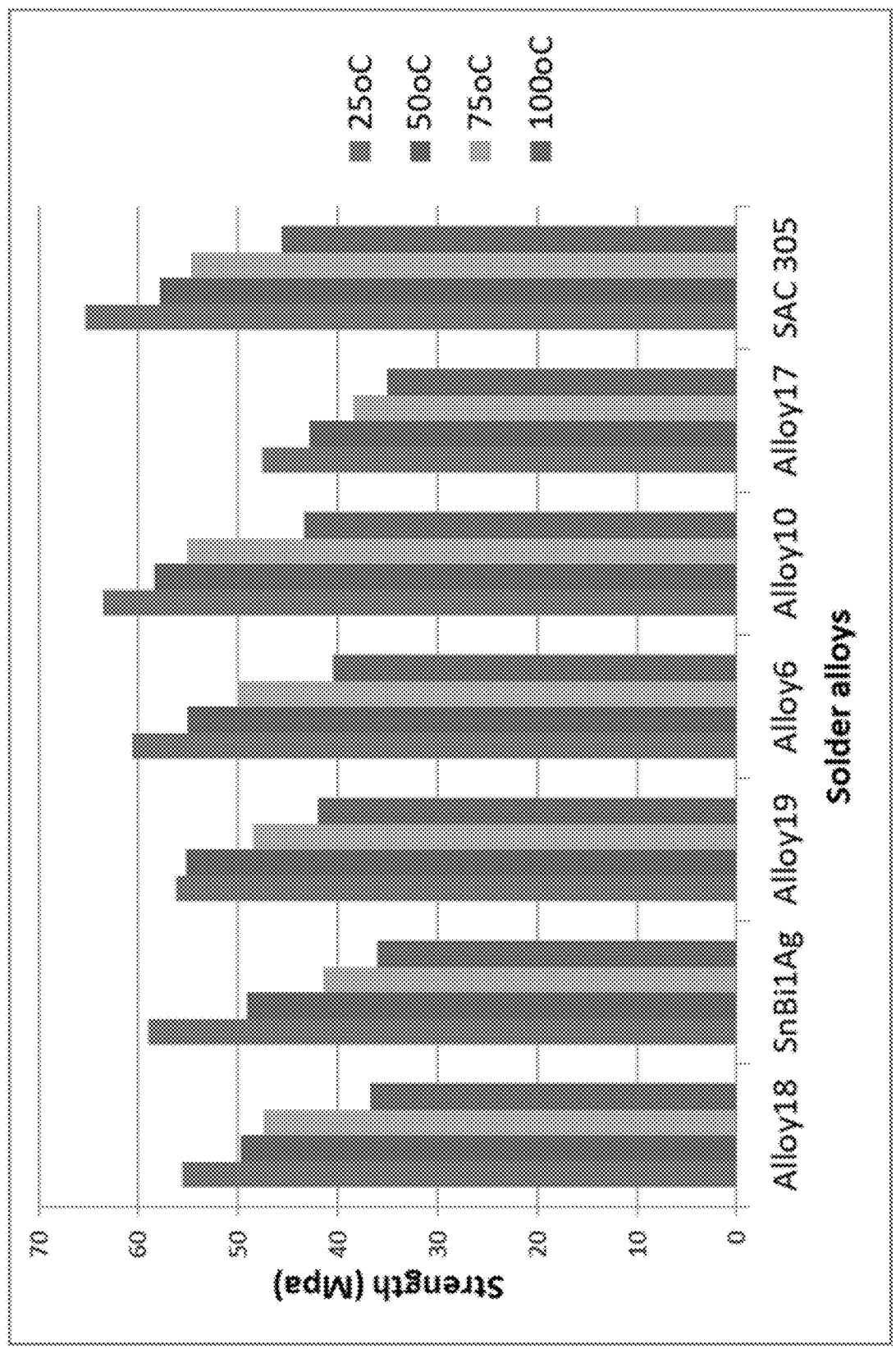
FIG. 10 illustrates plots showing the degradation of shear strength (in MPa) with elevated temperatures temperature (° C.) of five solder alloys in accordance with implementations of the disclosure, and two control solder alloys: SnBi1Ag and SAC305.

FIG. 10 illustrates plots showing the degradation of shear strength (in MPa) with elevated temperatures temperature (° C.) of five solder alloys (Alloys 6, 10, 17, 18, and 19 of Table 1) in accordance with implementations of the disclosure, and two control solder alloys: SnBi1Ag and SAC305. In this experiment, the test vehicle was 3×3 mm Cu on OSP. At a testing temperature of 100° C., all the alloys returned lower shear strength degradation as compared to SnBi1Ag. Table 2, below, shows the average measured values of shear strength at the various testing temperatures of the experiments of FIG. 10. Alloy 19 had the lowest shear strength degradation with an average of 25% at a 100° C. testing temperature.

TABLE 2

3 x 3 mm Cu Die Shear Strength Measurements 3 x 3 mm Cu Die Die Shear Strength (MPa)

| | Bi, wt. % | 25° C. | 50° C. | 75° C. | 100° C. | % Loss @100° C. |
|---|---|---|---|---|---|---|
| Alloy18 | 57.8 | 55.5 | 49.7 | 47.4 | 36.8 | 33.7 |
| SnBi1Ag | 57 | 59 | 49.1 | 41.5 | 36 | 39 |
| Alloy19 | 46 | 56.2 | 55.2 | 48.4 | 42 | 25.3 |
| Alloy6 | 35 | 60.6 | 55.1 | 50.1 | 40.4 | 33.3 |
| Alloy10 | 32 | 63.5 | 58.4 | 55.1 | 43.4 | 31.6 |
| Alloy17 | 3.9 | 47.5 | 42.9 | 38.4 | 35 | 26.3 |
| SAC 305 | 0 | 65.3 | 57.9 | 54.7 | 45.6 | 30.1 |

As shown in Table 2 by the average shear strength measurements of the 3×3 mm Cu die on an OSP surface finish for different temperatures, SnBi1Ag has the highest shear strength degradation at 100° C. as compared to solder alloys in accordance with the disclosure. While SnBi1Ag degrades by about 39% at 100° C., an alloy like Alloy17 degrades by about 26% when tested at this temperature. Although Alloy17 has the lowest shear strength values, the alloy shows the second least degradation in shear strength at 100° C. Shear strength stability at elevated temperatures may be important for many applications. The design of the solder alloys of Table 2 that are in accordance with the disclosure are such that the added alloying elements mitigate the brittleness of Bi and reduce degradation. For example, alloy19 has the least shear strength degradation although its Bi content is higher than most of the alloys.

Figure 11:
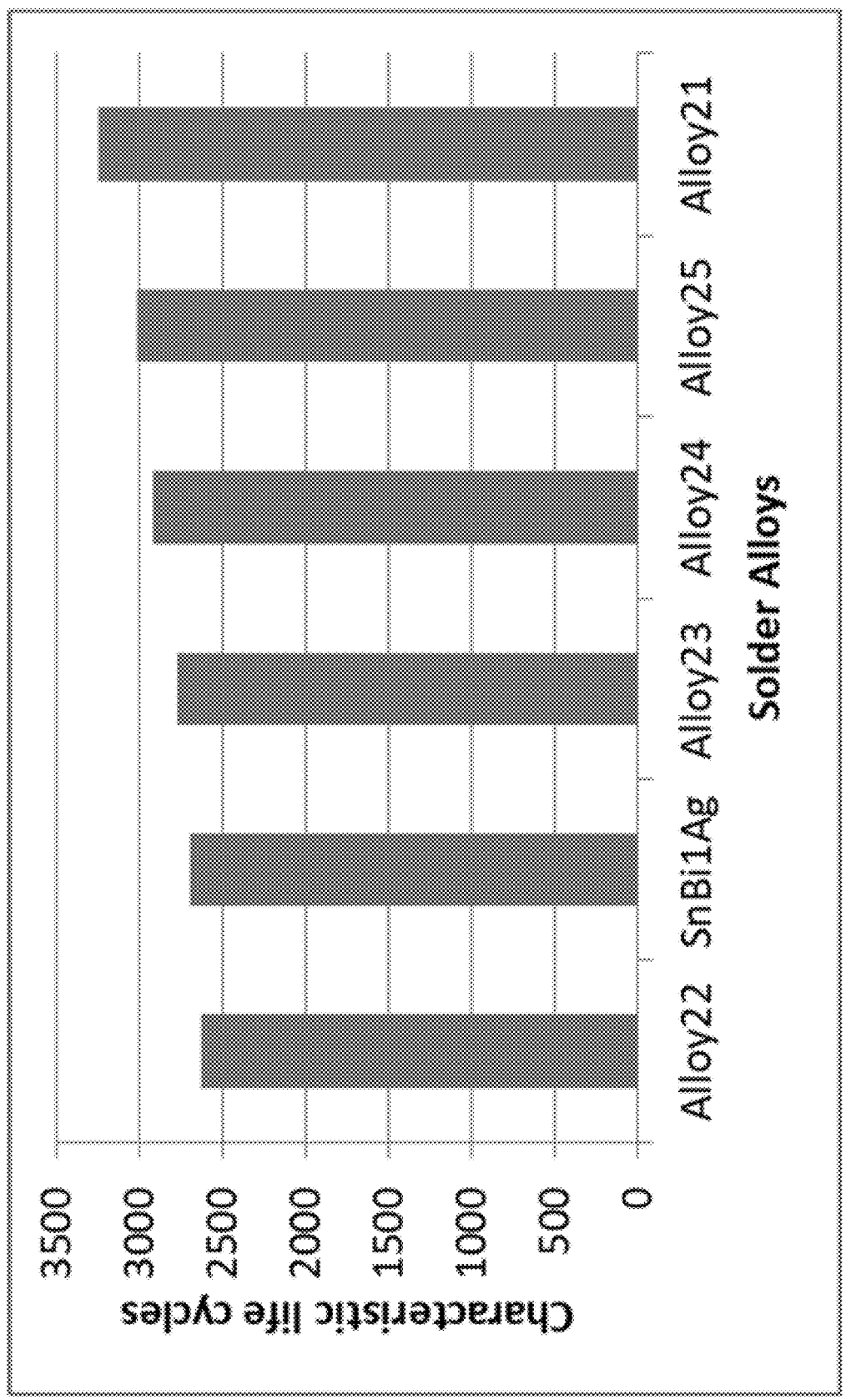
FIG. 11 illustrates thermal shock reliability test results of CABGA256 parts obtained from Weibull plots, in accordance with implementations of the disclosure.

FIG. 11 illustrates thermal shock reliability test results of CABGA256 parts obtained from Weibull plots, in accordance with implementations of the disclosure. The CABGA256 parts used five solder alloys in accordance with the disclosure (Alloys 21-25 of Table 1) and one control solder alloy: SnBi1Ag. In particular, the CABGA256 parts comprised 18 mil diameter SAC305 solder balls placed on a printed solder paste of the solder alloys and reflowed in the BTU oven with profiles having the appropriate peak reflow temperature. This combination of SAC and the alloys formed hybrid solder joints that were used to mimic a production line. The thermal shock profile used was −40/85° C. with 10 minutes dwell time at the extreme temperatures. As depicted, four of the five alloys in accordance with the disclosure were observed to outperform SnBi1Ag. Table 2, below, gives detailed information including the slope of the Weibull plots.

TABLE 3

CABGA 256 Thermal Shock Profile at −40/85° C.

CABGA256 Thermal Shock at −40/85° C.

| | Scale/Characteristic Life | Shape/Slope |
|---|---|---|
| Alloy22 | 2634 | 9.7 |
| SnBi1Ag | 2693 | 5.1 |
| Alloy23 | 2777 | 6.7 |
| Alloy24 | 2916 | 12.4 |
| Alloy25 | 3020 | 4.3 |
| Alloy21 | 3250 | 4.8 |

In particular, table 3 provides a summary of the thermal shock results from the Weibull plot analysis. The characteristic life, which provides a measure of the cycle at which 63.2% of the parts have failed, and the shape/slope, which provides a measure of the failure rate, are key parameters used to determine the performance of various alloys during reliability testing such as thermal cycling, thermal shock, drop shock, vibration and power cycling. Ideally, a good alloy has to have high scale and high shape values. When the scale values are close as is the case with alloys SnBi1Ag, alloy22, and alloy23, the best performing alloy in this case is determined from the slope. For example, in the case of these three alloys, alloy 23 is ranked higher than alloy 22 and SnBi1Ag. Alloy22 is ranked higher than SnBi1Ag because its predictability is higher due to a higher shape factor.

Tables 4 and 5, below, show bismuth content and tensile test and DSC results of selected SnBi and SnIn based solder alloys in accordance with implementations of the disclosure. The solidus temperature, liquidus temperature, tensile strength, Yield strength and Young's modulus are given. The tensile test results were obtained from samples of one-inch gauge length, quarter inch sample diameter, and the tests were performed at a speed of 0.1 inch per minute at room temperature.

TABLE 4

Test Results for SnBi Based Alloys

Examples of SnBi Based Alloys

| | Bi, wt. % | Melting, ° C. | Tensile Strength, Mpa | Yield Strength, Mpa | Young's Modulus, Gpa |
|---|---|---|---|---|---|
| Alloy18 | 57.8 | 136/146 | 79 | 59 | 31 |
| Alloy8 | 43.5 | 135/164 | 81 | 64 | 40 |

TABLE 4-continued

Test Results for SnBi Based Alloys

Examples of SnBi Based Alloys

| | Bi, wt. % | Melting, ° C. | Tensile Strength, Mpa | Yield Strength, Mpa | Young's Modulus, Gpa |
|---|---|---|---|---|---|
| Alloy20 | 39.1 | 136/176 | 97 | 72 | 47 |
| Alloy11 | 32.4 | 134/185 | 96 | 74 | 26 |
| Alloy9 | 27.6 | 130/185 | 105.3 | 79 | 40 |

Table 4, above, shows test results of high Bi containing SnBi based solder alloys in accordance with the disclosure. These solder alloys have high tensile strengths and low Young's modulus at room temperature as compared to the high In containing alloys of Table 5, below, which have lower tensile strengths but higher Young's modulus values. Typically, as the composition approaches the eutectic values, the pasty range narrows significantly. However, the brittleness due to the increased amount of Bi is present. Even for alloys with high amounts of Bi, the material properties may be engineered by addition of alloying elements with the ability to minimize the chances of Bi segregation at the interface. Such techniques have been applied in this disclosure and have resulted in some alloys having good thermal shock and drop shock performances.

TABLE 5

Test Results for SnIn Based Alloys

Examples of the SnIn Based Alloys

| | Bi, wt. % | Melting, ° C. | Tensile Strength, Mpa | Yield Strength, Mpa | Young's Modulus, Gpa |
|---|---|---|---|---|---|
| Alloy7 | 5.0 | 156/194 | 66.1 | 53.6 | 61.5 |
| Alloy16 | 3.9 | 160/194 | 86 | 61 | 64 |
| Alloy17 | 3.9 | 159/193 | 80 | 59.3 | 65.1 |

The advantages of the high Indium containing solder alloys of Table 5, above, may emanate from the high ductility of Indium metal. Such solders may be designed to provide high impact shock resistance, especially when the alloys are used in portable devices such as mobile phones, laptops and so forth. The solder alloys also have high modulus values at room temperature.

Although the amount of Bi present in each of the alloys given in Tables 4-5 ranges from 3.9 wt % to 57.8 wt %. It should be noted that solder alloys in accordance with the disclosure may have lower than a 1.4 wt % Bi content. As the foregoing experimental results show, as the amount of Bi is increased, the Young's modulus gets closer to the bulk modulus of Bi (31 GPa). The tensile strength and the yield strength are enhanced too. For example, as shown in FIG. 10, by balancing the constituents of the solder alloy composition, it is possible to design an alloy such as Alloy8 with higher yield strength, higher shear strength but lower modulus than SAC305. It is also possible to design an alloy such as Alloy16 with higher yield strength, higher shear strength, and higher modulus than SAC305. The addition of Ni and Sb to such alloys may improve the microstructure of the solder alloy by, for example, refining the grains. Additions of Ni up to 0.1 wt % and Sb up to 0.5 wt % may serve this purpose.

Table 6, below, shows DSC melting data of some solder alloys in accordance with the disclosure. As shown, the solder alloy solidus, liquidus and pasty range may be tailored by compositional balancing of the alloying elements. In particular, the pasty range is observed to decrease with a high amount of Bi (e.g., >about 48 wt % Bi, and particularly >about 50 wt % Bi).

TABLE 6

Bismuth Composition of Alloys in Accordance with the Disclosure

| Alloy | Bi, wt % | Melting, ° C. |
|---|---|---|
| Alloy1 | 55 | 137/143 |
| Alloy2 | 48 | 136/158 |
| Alloy3 | 46 | 139/175 |

It should be appreciated that the example solder alloys used in describing the details of the invention are used as representative alloys. Modifications and changes to the compositions that may arise from these alloys are within the breadth of the invention.

As used herein, the term "about" is used to describe and account for small variations in a numerical parameter, for example, due to rounding of the numerical parameter. For example, in quantitative terms, the term "about" can refer to less than or equal to ±5%, less than or equal to ±2%, less than or equal to ±1%, less than or equal to ±0.5%, less than or equal to ±0.2%, less than or equal to ±0.1%, and less than or equal to ±0.05%. Moreover, where "about" is used herein in conjunction with a numerical parameter it is understood that the exact value of the numerical parameter is also contemplated and described. For example, the term "about 10" expressly contemplates, describes and includes exactly 10.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The illustrated embodiments and their various alternatives can be implemented without confinement to the illustrated examples. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent.

What is claimed is:

1. A solder alloy, consisting of:
12.5 to 18 wt % In;
1.0 wt % to 4.0 wt % Ag;
greater than 0 wt % to 3 wt % Cu;
3.4 wt % to 12 wt % Bi;
greater than 0 wt % to 5 wt % Sb;
greater than 0 wt % to 1.5 wt % Ni;
optionally, one or more of greater than 0 wt % to 2.5 wt % Zn, greater than 0 wt % to 1.5 wt % Co, greater than 0 wt % to 1.5 wt % Ge, greater than 0 wt % to 1.5 wt % P, and greater than 0 wt % to 1.5 wt % Mn; and
a remainder of Sn, wherein the solder alloy has a liquidus temperature below 210° C.

2. The solder alloy of claim 1, consisting of:
12.5 to 18 wt % In;
1.0 to 4.0 wt % Ag;
3.4 wt % to 12 wt % Bi;
greater than 0 wt % to 3 wt % Cu;
greater than 0 wt % to 2 wt % Sb;
greater than 0 wt % to 1.5 wt % Ni;
optionally, one or more of greater than 0 wt % to 2.5 wt % Zn, greater than 0 wt % to 1.5 wt % Co, greater than 0 wt % to 1.5 wt % Ge, greater than 0 wt % to 1.5 wt % P, and greater than 0 wt % to 1.5 wt % Mn; and
the remainder of Sn.

3. The solder alloy of claim 2, wherein the solder alloy has greater than 70 wt % Sn.

4. The solder alloy of claim 2, consisting of:
12.5 to 18 wt % In;
1.0 to 4.0 wt % Ag;
3.4 wt % to 12 wt % Bi;
greater than 0 wt % to 2 wt % Cu;
greater than 0 wt % to 2 wt % Sb;
greater than 0 wt % to 0.2 wt % Ni;
optionally, one or more of greater than 0 wt % to 0.2 wt % Co, and greater than 0 wt % to 0.2 wt % Ge; and
the remainder of Sn.

5. The solder alloy of claim 4, consisting of: 12.5 to 18 wt % In; 1.0 to 4.0 wt % Ag; greater than 0 wt % to 2 wt % Cu; 3.4 wt % to 12 wt % Bi; greater than 0 wt % to 2 wt % Sb; greater than 0 wt % to 0.2 wt % Ni; and the remainder of Sn.

6. The solder alloy of claim 1, wherein the solder alloy includes 13 wt % to 16.9 wt % In.

7. The solder alloy of claim 1, wherein the solder alloy has a yield strength between 50 and 70 MPa at room temperature.

8. The solder alloy of claim 1, wherein the solder alloy has a tensile strength between 65 and 90 MPa at room temperature.

9. The solder alloy of claim 1, wherein the liquidus temperature is between 140° C. and 200° C.

10. The solder alloy of claim 1, wherein the solder alloy includes 3.4 wt % to 5 wt % Bi.

11. The solder alloy of claim 1, wherein the solder alloy includes 1.2 wt % to 3 wt % Cu.

12. The solder alloy of claim 11, wherein the solder alloy includes 1.2 wt % to 2.4 wt % Cu.

13. The solder alloy of claim 12, wherein the solder alloy includes 3.4 wt % to 5 wt % Bi.

14. The solder alloy of claim 13, wherein the solder alloy includes greater than 0 wt % to 2 wt % Sb.

15. A solder paste, comprising:
a solder powder consisting of:
12.5 to 18 wt % In;
1.0 wt % to 4.0 wt % Ag;
greater than 0 wt % to 3 wt % Cu;
3.4 wt % to 12 wt % Bi;
greater than 0 wt % to 5 wt % Sb;
greater than 0 wt % to 1.5 wt % Ni;
optionally, one or more of greater than 0 wt % to 2.5 wt % Zn, greater than 0 wt % to 1.5 wt % Co, greater than 0 wt % to 1.5 wt % Ge, greater than 0 wt % to 1.5 wt % P, and greater than 0 wt % to 1.5 wt % Mn; and
a remainder of Sn, wherein the solder powder has a liquidus temperature below 210° C.; and
flux.

16. The solder paste of claim 15, wherein the solder powder consists of:
12.5 to 18 wt % In;
1.0 to 4.0 wt % Ag;
greater than 0 wt % to 3 wt % Cu;
3.4 wt % to 12 wt % Bi;
greater than 0 wt % to 2 wt % Sb;
greater than 0 wt % to 1.5 wt % Ni;
optionally, one or more of greater than 0 wt % to 2.5 wt % Zn, greater than 0 wt % to 1.5 wt % Co, greater than 0 wt % to 1.5 wt % Ge, greater than 0 wt % to 1.5 wt % P, and greater than 0 wt % to 1.5 wt % Mn; and
the remainder of Sn.

17. The solder paste of claim 16, wherein the solder powder consists of:
12.5 to 18 wt % In;
1.0 to 4.0 wt % Ag;
greater than 0 wt % to 2 wt % Cu;
3.4 wt % to 12 wt % Bi;
greater than 0 wt % to 2 wt % Sb;
greater than 0 wt % to 0.2 wt % Ni;
optionally, one or more of greater than 0 wt % to 0.2 wt % Co, and greater than 0 wt % to 0.2 wt % Ge; and
the remainder of Sn.

18. The solder paste of claim 17, wherein the solder powder consists of: 12.5 to 18 wt % In; 1.0 to 4.0 wt % Ag; greater than 0 wt % to 2 wt % Cu; 3.4 wt % to 12 wt % Bi; greater than 0 wt % to 2 wt % Sb; greater than 0 wt % to 0.2 wt % Ni; and the remainder of Sn.

19. A solder joint formed by a process comprising:
applying a solder alloy between a substrate and device to form an assembly, the solder alloy consisting of:
12.5 to 18 wt % In;
1.0 wt % to 4.0 wt % Ag;
greater than 0 wt % to 3 wt % Cu;
3.4 wt % to 12 wt % Bi;
greater than 0 wt % to 5 wt % Sb;
greater than 0 wt % to 1.5 wt % Ni;
optionally, one or more of greater than 0 wt % to 2.5 wt % Zn, greater than 0 wt % to 1.5 wt % Co, greater than 0 wt % to 1.5 wt % Ge, greater than 0 wt % to 1.5 wt % P, and greater than 0 wt % to 1.5 wt % Mn; and
a remainder of Sn, wherein the solder alloy has a liquidus temperature below 210° C.; and
reflow soldering the assembly to form the solder joint.

* * * * *